(12) United States Patent
Smith et al.

(10) Patent No.: US 9,130,945 B2
(45) Date of Patent: Sep. 8, 2015

(54) DETECTION AND RESPONSE TO UNAUTHORIZED ACCESS TO A COMMUNICATION DEVICE

(71) Applicant: Schweitzer Engineering Laboratories, Inc., Pullman, WA (US)

(72) Inventors: Rhett Smith, Kuna, ID (US); Colin Gordon, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 231 days.

(21) Appl. No.: 13/829,047

(22) Filed: Mar. 14, 2013

(65) Prior Publication Data

US 2014/0109182 A1 Apr. 17, 2014

Related U.S. Application Data

(60) Provisional application No. 61/713,391, filed on Oct. 12, 2012.

(51) Int. Cl.
*H04L 29/06* (2006.01)
(52) U.S. Cl.
CPC ............ *H04L 63/10* (2013.01); *H04L 63/1416* (2013.01); *Y04S 40/24* (2013.01)
(58) Field of Classification Search
CPC ..... H04L 63/1416; H04L 63/10; H04L 63/08; H04L 63/0861
USPC ................ 726/5–6, 10, 19–23; 713/151, 168
See application file for complete search history.

(56) References Cited

U.S. PATENT DOCUMENTS

| 4,754,482 A | 6/1988 | Weiss |
| 5,054,068 A | 10/1991 | Hess |
| 5,289,468 A | 2/1994 | Yoshida |

(Continued)

FOREIGN PATENT DOCUMENTS

| WO | 0075900 | 12/2000 |
| WO | 2011073241 | 6/2011 |

OTHER PUBLICATIONS

EtherGate, EtherPoll User's Addendum, Jan. 27, 2004.

(Continued)

*Primary Examiner* — Venkat Perungavoor
*Assistant Examiner* — Amir Mehrmanesh
(74) *Attorney, Agent, or Firm* — Jared L. Cherry; Richard M. Edge

(57) ABSTRACT

A communication gateway consistent with the present disclosure may detect unauthorized physical or electronic access and implement security actions in response thereto. A communication gateway may provide a communication path to an intelligent electronic device (IED) using an IED communications port configured to communicate with the IED. The communication gateway may include a physical intrusion detection port and a network port. The communication gateway may further include control logic configured to evaluate physical intrusion detection signal. The control logic may be configured to determine that the physical intrusion detection signal is indicative of an attempt to obtain unauthorized access to one of the communication gateway, the IED, and a device in communication with the gateway; and take a security action based upon the determination that the indication is indicative of the attempt to gain unauthorized access.

27 Claims, 4 Drawing Sheets

(56) References Cited

U.S. PATENT DOCUMENTS

| | | | |
|---|---|---|---|
| 5,682,134 A | 10/1997 | Stallbohm | |
| 5,754,939 A | 5/1998 | Herz | |
| 5,986,543 A | 11/1999 | Johnson | |
| 6,212,662 B1 | 4/2001 | Hekstra | |
| 6,259,706 B1 | 7/2001 | Shimada | |
| 6,542,464 B1 | 4/2003 | Takeda | |
| 6,571,279 B1 | 5/2003 | Herz | |
| 7,076,797 B2 | 7/2006 | Loveland | |
| 7,127,328 B2 * | 10/2006 | Ransom | 700/286 |
| 7,216,043 B2 | 5/2007 | Ransom | |
| 7,218,226 B2 | 5/2007 | Wehrenberg | |
| 7,224,796 B2 | 5/2007 | Watanabe | |
| 7,304,586 B2 | 12/2007 | Wang | |
| 7,389,357 B2 | 6/2008 | Duffie | |
| 7,415,725 B2 | 8/2008 | Henneberry | |
| 7,460,536 B1 | 12/2008 | Williams | |
| 7,540,022 B2 | 5/2009 | Barari | |
| 7,548,161 B2 | 6/2009 | Wehrenberg | |
| 7,574,740 B1 * | 8/2009 | Kennis | 726/22 |
| 7,599,748 B2 | 10/2009 | Dove | |
| 7,644,290 B2 * | 1/2010 | Ransom et al. | 713/194 |
| 7,680,273 B2 | 3/2010 | Whitehead | |
| 7,724,657 B2 | 5/2010 | Rao | |
| 7,750,814 B2 | 7/2010 | Fisher | |
| 7,818,582 B2 | 10/2010 | Marion | |
| 7,843,897 B2 | 11/2010 | Casebolt | |
| 7,895,644 B1 | 2/2011 | Thakur | |
| 7,950,051 B1 | 5/2011 | Spitz | |
| 7,958,544 B2 | 6/2011 | Chen | |
| 7,986,233 B2 | 7/2011 | Wehrenberg | |
| 8,155,326 B2 | 4/2012 | Schweitzer | |
| 8,665,061 B2 * | 3/2014 | Kagan et al. | 340/5.52 |
| 8,677,464 B2 | 3/2014 | Smith | |
| 8,707,432 B1 * | 4/2014 | Rathi et al. | 726/23 |
| 2001/0052072 A1 | 12/2001 | Jung | |
| 2002/0003881 A1 | 1/2002 | Reitmeier | |
| 2003/0070091 A1 | 4/2003 | Loveland | |
| 2003/0147420 A1 | 8/2003 | Beckwith | |
| 2004/0028033 A1 | 2/2004 | Koistinen | |
| 2004/0073788 A1 | 4/2004 | Kim | |
| 2004/0138786 A1 | 7/2004 | Blackett | |
| 2004/0145467 A1 | 7/2004 | Roby | |
| 2004/0193329 A1 | 9/2004 | Ransom | |
| 2005/0005093 A1 | 1/2005 | Bartels | |
| 2005/0039040 A1 | 2/2005 | Ransom | |
| 2005/0175182 A1 | 8/2005 | Ueno | |
| 2006/0039355 A1 | 2/2006 | Rao | |
| 2006/0077999 A1 | 4/2006 | Kagan | |
| 2006/0083260 A1 | 4/2006 | Wang | |
| 2006/0140146 A1 | 6/2006 | Funk | |
| 2006/0170409 A1 | 8/2006 | Kagan | |
| 2006/0238932 A1 | 10/2006 | Westbrock | |
| 2007/0006291 A1 | 1/2007 | Barari | |
| 2007/0055889 A1 | 3/2007 | Henneberry | |
| 2008/0022377 A1 | 1/2008 | Chen | |
| 2008/0162930 A1 | 7/2008 | Finney | |
| 2009/0265124 A1 | 10/2009 | Kagan | |
| 2010/0002879 A1 | 1/2010 | Risley | |
| 2010/0046545 A1 | 2/2010 | Kagan | |
| 2010/0082792 A1 | 4/2010 | Johnson | |
| 2010/0180338 A1 | 7/2010 | Stewart | |
| 2010/0325687 A1 | 12/2010 | Iverson | |
| 2012/0278907 A1 | 11/2012 | Wehrenberg | |

OTHER PUBLICATIONS

John A. Kinast, AGA, 12 part 2 draft, American Gas Association, Jan. 23, 2006.

PCT/US2012/043593 Patent Cooperation Treaty, International Search Report and Written Opinion of the International Searching Authority, Aug. 24, 2012.

Airmagnet, Inc. Best Practices for Rogue Detection and Annihilation, Nov. 2004.

PCT/US2013/063202 International Search Report and Written Opinion of the International Searching Authority, Jan. 3, 2014.

* cited by examiner

DETECTION AND RESPONSE TO UNAUTHORIZED ACCESS TO A COMMUNICATION DEVICE

RELATED APPLICATIONS

This application claims priority under 35 U.S.C. §119(e) to U.S. Provisional Patent Application No. 61/713,391, filed 12 Oct. 2012, and titled "DETECTION AND RESPONSE TO UNAUTHORIZED ACCESS TO A COMMUNICATION DEVICE," which is incorporated herein by reference in its entirety.

GOVERNMENT INTEREST

This invention was made with government support under Contract No. DE-OE0000538 awarded by the Department of Energy. The Government has certain rights in this invention.

TECHNICAL FIELD

This disclosure generally relates to systems and methods for detecting and responding to an unauthorized access to a communication device. More particularly, the systems and methods disclosed herein may be implemented in connection with network devices and intelligent electronic devices in an electric power delivery system to detect and respond to unauthorized physical access.

BRIEF DESCRIPTION OF THE DRAWINGS

Non-limiting and non-exhaustive embodiments of the disclosure are described, including various embodiments of the disclosure with reference to the figures, in which.

Figure 1:
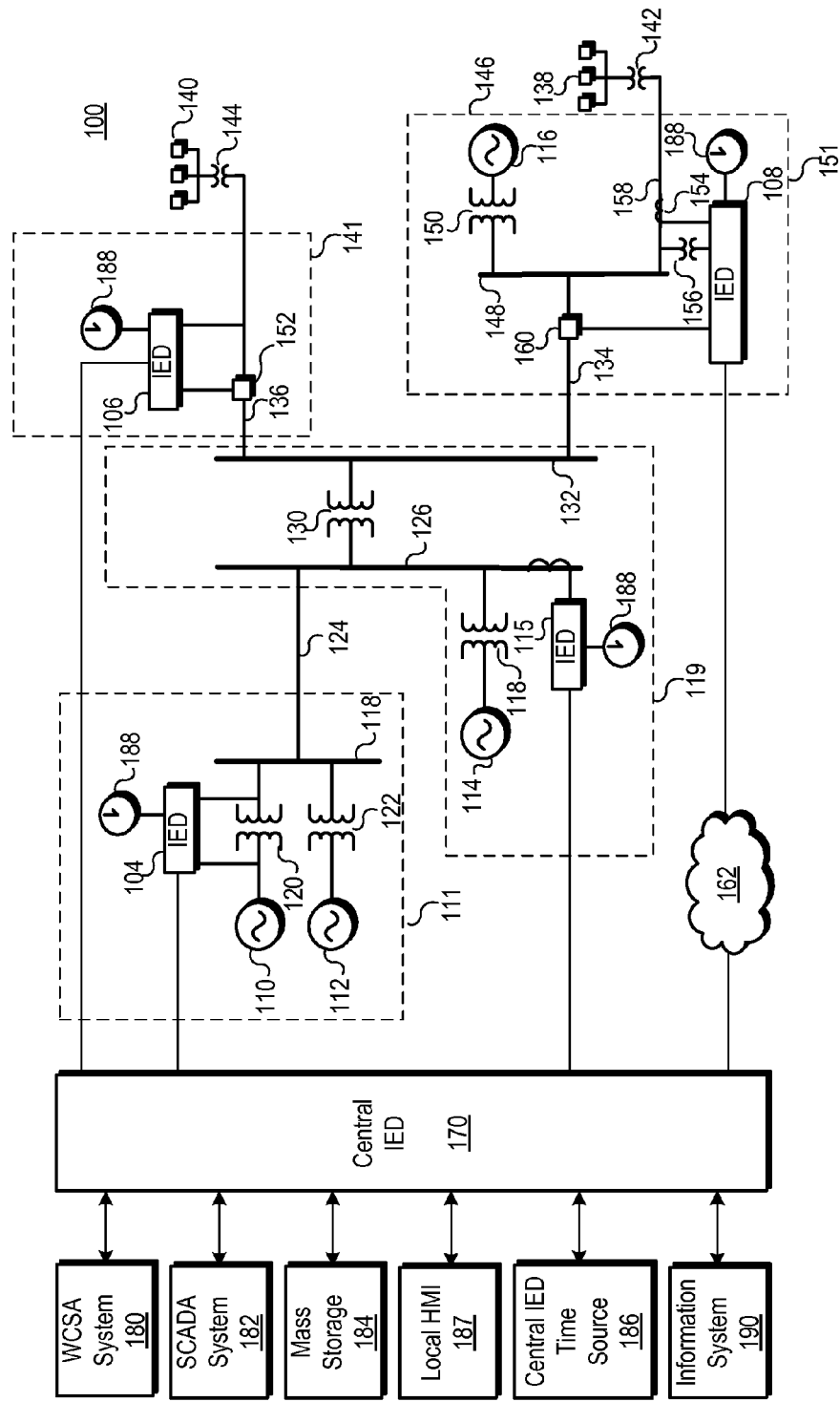
FIG. 1 illustrates a simplified one-line diagram of an electric power delivery system and associated intelligent electronic devices (IEDs) consistent with various embodiments of the present disclosure.

In the following description, numerous specific details are provided for a thorough understanding of the various embodiments disclosed herein. The systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

The present disclosure provides systems and methods for detecting and responding to unauthorized access to a communication device. According to various embodiments, the communication device may be configured for secure communication with one or more intelligent electronic devices (IEDs), a supervisory control and data acquisition (SCADA) system, and/or a communication network. IEDs may be configured to monitor a portion of an electric power delivery system, and provide control to the electric power delivery system. According to various protection and control algorithms, IEDs may be configured to communicate with other IEDs, controllers, data acquisition systems, and/or the like.

IEDs may be positioned near control centers, in substations, or may be distributed in the electric power delivery system. For example, IEDs may be positioned near primary equipment on transmission or distribution lines away from the substation. In one embodiment, the IED may be a recloser control in communication with and providing protection and control to a recloser. The recloser may be located remote from the substation. The IED may be disposed for example, in a cabinet or other enclosure mounted on a power pole.

Remotely located equipment associated with an electric power delivery system pose a security risk in that unauthorized users may be able to obtain physical access to an enclosure containing such equipment. While the enclosures are typically physically secured using locks, fences, or other barriers, such barriers may be overcome by an unauthorized user with sufficient motivation. Equipment stored within an enclosure may include buttons, human-machine interfaces, and other mechanisms for changing settings associated with the equipment. Further, communications may be unencrypted within a cabinet, building, or other enclosure containing equipment associated with an electric power delivery system. This may be true particularly where legacy systems are used that do not natively support encrypted communication. Accordingly, an unauthorized user with physical access to and unencrypted communication channel may present significant security concerns.

One possible remediation is to place a communication gateway in the cabinet with the IED. The IED may be configured to communicate only with the communication gateway, which, in turn, may communicate with the controller, data acquisition system, or the like. The communication gateway may be configured to encrypt communications with the controller, data acquisition system, and the like; however, if the cabinet is compromised, the communications gateway and/or IED may remain vulnerable to attack.

Communications among IEDs in an electric power delivery system may typically be trusted communications. As the term is used herein, a trusted communication refers to a message that includes indicia of trust. Indicia of trust may include, but is not limited to, a recognized identifier in the message that is associated with a trusted source, a trusted communication path or port from which the message is received, an authenticated node that submitted the message, an encrypted message capable of being deciphered using a technique (e.g. public/private key cryptography), or a message that includes authentication criteria. Of course, other indicia of trust may also be utilized in connection with various embodiments consistent with the present disclosure.

According to various embodiments disclosed herein, a communications gateway includes physical access detection for detecting when an enclosure is opened and/or otherwise physically accessed. The communications gateway may further be configured to take certain steps when unauthorized access to an enclosure is detected. For example, according to some embodiments, communications received from the gateway after a detection of unauthorized physical access may no longer be trusted. Accordingly, certain actions or commands may be selectively disregarded as a result of the untrusted nature of the communications. According to some embodiments, communications from a communications gateway that has been accessed without authorization may be blocked entirely. The communication gateway may further be configured to log all communications after unauthorized physical access has been detected.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. In particular, "an embodiment" may be a system, an article of manufacture (such as a computer-readable storage medium), a method, and/or a product of a process.

The phrases "connected to" and "in communication with" refer to any form of interaction between two or more components, including mechanical, electrical, magnetic, and electromagnetic interaction. Two components may be connected to each other, even though they are not in direct contact with each other, and even though there may be intermediary devices between the two components. For instance, an IED may be connected to a gateway session manager through one or more intermediary IEDs or networking devices. Such networks may be modeled as tree structures, as is common in the art.

As used herein, the term IED may refer to any microprocessor-based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs may be connected to a network, and communication on the network may be facilitated by networking devices including but not limited to multiplexers, routers, hubs, gateways, firewalls, and switches. Furthermore, networking and communication devices may be incorporated in an IED or may be in communication with an IED. The term IED may be used interchangeably to describe an individual IED or a system comprising multiple IEDs.

As used herein, the term "login credentials" may refer to any type of authentication method known to be useful in the art. For example, login credentials commonly refer to an ASCII encoded username and password combination; accordingly, the terms "login credentials" and "username and password(s)" may be used interchangeably herein. However, username and password(s) may be replaced with any of a wide variety of authentication protocols and/or techniques including cryptographic protocols for authenticating machines, challenge-response methods, zero-knowledge proofs, time-synchronized single use passwords, security tokens, biometric authentication, graphical or other non-text based passwords, voice authentication, and the like.

Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like. The processor may include a special purpose processing device, such as an ASIC, PAL, PLA, PLD, Field Programmable Gate Array, or other customized or programmable device. The computer may also include a computer-readable storage device, such as non-volatile memory, static RAM, dynamic RAM, ROM, CD-ROM, disk, tape, magnetic, optical, flash memory, or other computer-readable storage medium.

Suitable networks for configuration and/or use, as described herein, include one or more local area networks, wide area networks, metropolitan area networks, and/or "Internet" or internet protocol (IP) networks, such as the World Wide Web, a private Internet, a secure Internet, a value-added network, a virtual private network, an extranet, an intranet, or even standalone machines that communicate with other machines by physical transport of media. In particular, a suitable network may be formed from parts or entireties of two or more other networks, including networks using disparate hardware and network communication technologies. A network may incorporate landlines, wireless communication, and combinations thereof.

The network may include communications or networking software, such as software available from Novell, Microsoft, Artisoft, and other vendors, and may operate using TCP/IP, SPX, IPX, RS-232, and other protocols over twisted pair, coaxial, or optical fiber cables, telephone lines, satellites, microwave relays, modulated AC power lines, physical media transfer, and/or other data transmission media. The network may encompass smaller networks and/or may be connectable to other networks through a gateway or similar mechanism.

Aspects of certain embodiments described herein may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The software modules described herein tangibly embody programs, functions, and/or instructions that are executable by computer(s) to perform tasks as described herein. Suitable software, as applicable, may be provided using the teachings presented herein and programming languages and tools, such as XML, Java, Pascal, C++, C, database languages, APIs, SDKs, assembly, firmware, microcode, and/or other languages and tools. Additionally, software, firmware, and hardware may be interchangeably used to implement a given function.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. All such configurations are encompassed within the scope of the present disclosure.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. In other instances, well-known structures, materials, or operations are not shown or described in detail to avoid obscuring aspects of this disclosure. In addition, the steps of a method do not necessarily need to be executed in any specific order, or even sequentially, nor need the steps be executed only once, unless otherwise specified.

FIG. 1 illustrates a simplified one-line diagram of an electric power delivery system 100 and associated IEDs 104, 106, 108, 115, and 170 consistent with certain embodiments disclosed herein. System 100 includes various substations and IEDs 104, 106, 108, 115, and 170 configured to perform various functions. System 100 is provided for illustrative purposes and does not imply any specific arrangements or functions required of any particular IED. In some embodiments, IEDs 104, 106, 108, 115, and 170 may be configured to monitor and communicate information, such as voltages, currents, equipment status, temperature, frequency, pressure, density, infrared absorption, radio-frequency information, partial pressures, viscosity, speed, rotational velocity, mass, switch status, valve status, circuit breaker status, tap status, meter readings, and the like. Further, IEDs 104, 106, 108, 115, and 170 may be configured to communicate calculations, such as phasors (which may or may not be synchronized as synchrophasors), events, fault distances, differentials, impedances, reactances, frequencies, and the like.

The electric power delivery system 100 illustrated in FIG. 1 may include a generation substation 111. Substation 111 may include generators 110 and 112, which are connected to a bus 118 through step-up transformers 120 and 122. Bus 118 may be connected to bus 126 in substation 119 via transmission line 124. Although the equipment in substation 111 may be monitored and/or controlled by various IEDs, only a single IED 104 is shown. IED 104 may be a transformer protection IED for transformer 120. IED 104 may be in communication with a common time source 188 which, as indicated below, may be distributed in system 100 using a communications network or using a universal time source, such as a global positioning system (GPS), or the like. Utilizing a common or universal time source may ensure that IEDs have a synchronized time signal that can be used to generate time synchronized data, such as synchrophasors.

Substation 119 may include a generator 114, which may be a distributed generator, and which may be connected to bus 126 through step-up transformer 118. Bus 126 may be connected to a distribution bus 132 via a step-down transformer 130. Various distribution lines 136 and 134 may be connected to distribution bus 132. Distribution line 136 may lead to substation 141 where the line is monitored and/or controlled using IED 106, which may selectively open and close breaker 152. Load 140 may be fed from distribution line 136. Further step-down transformer 144 may be used to step down a voltage for consumption by load 140.

Distribution line 134 may lead to substation 151, and deliver electric power to bus 148. Bus 148 may also receive electric power from distributed generator 116 via transformer 150. Distribution line 158 may deliver electric power from bus 148 to load 138, and may include further step-down transformer 142. Circuit breaker 160 may be used to selectively connect bus 148 to distribution line 134. IED 108 may be used to monitor and/or control circuit breaker 160 as well as distribution line 158.

A central IED 170 may be in communication with various IEDs 104, 106, 108, and 115, using a data communications network. IEDs 104, 106, 108, and 115 may be remote from central IED 170. The remote IEDs 104, 106, 108, and 115 may communicate over various media such as a direct communication from IED 170 or over a wide-area communications network 162. IEDs 104, 106, 108, 115, and 170 may be communicatively linked together using a data communications network, and may further be communicatively linked to a central monitoring system, such as a supervisory control and data acquisition (SCADA) system 182, an information system (IS) 190, and/or a wide area control and situational awareness (WCSA) system 180. The data communications network among IEDs 104, 106, 108, 115, and 170 may utilize a variety of network technologies, and may comprise network devices such as modems, routers, firewalls, virtual private network servers, and the like, which are not shown in FIG. 1.

The various IEDs in system 100 may obtain electric power information from monitored equipment using potential transformers (PTs) for voltage measurements (e.g., potential transformer 156), current transformers (CTs) for current measurements (e.g., current transformer 154), and the like. The PTs and CTs may include any device capable of providing outputs that can be used by the IEDs to make potential and current measurements, and may include traditional PTs and CTs, optical PTs and CTs, Rogowski coils, hall-effect sensors, and the like.

Each IED may be configured to access a common time source 188. Common time source 188 may be distributed via a communications network (using, for example, IEEE-1588 protocol, NTP protocol, or the like), or obtained locally at each IED. Common time source 188 may be a universal time, such as that delivered using GPS satellites, WWVB, WWV, or the like. A common time source may be used to time-synchronize measurements of the electric power system and/or in the calculation of synchrophasors. Phasors calculated by the IEDs may include a time stamp indicating a time at which the measurement was made.

Central IED 170 may also be in communication with a number of other devices or systems. Such devices or systems may include, for example, a WCSA system 180, SCADA system 182, or local Human-Machine Interface (HMI) 187. Local HMI 187 may be used to change settings, issue control instructions, retrieve an event report, retrieve data, and the like. In some embodiments, WCSA system 180 may receive and process the time-aligned data, and may coordinate time synchronized control actions at the highest level of the electric power delivery system 100. Mass storage device 184 may store data relating to system 100 from IEDs 104, 106, 108, 115, and 170.

Central IED 170 may further include a time input, which may receive a time signal from a central IED time source 186.

Central IED time source 186 may also be used by central IED 170 for time stamping information and data. Time synchronization may be helpful for data organization, real-time decision-making, as well as post-event analysis. Time synchronization may further be applied to network communications. In certain embodiments, central IED time source 186 and common time source 177 may be the same time source. Common time source 188 may be any time source that is an acceptable form of time synchronization, including, but not limited to, a voltage controlled temperature compensated crystal oscillator, Rubidium and Cesium oscillators with or without digital phase locked loops, microelectromechanical systems (MEMS) technology, which transfers the resonant circuits from the electronic to the mechanical domains, or a GPS receiver with time decoding. In the absence of a common time source available to all IEDs, central IED 170 may serve as a common time source by distributing a time synchronization signal.

Information system 190 generally includes hardware and software to enable network communication, network security, user administration, Internet and intranet administration, remote network access and the like. Information system 190 may generate information about the network to maintain and sustain a reliable, quality, and secure communications network by running real-time business logic on network security events, perform network diagnostics, optimize network performance, and the like.

Data communications between IEDs 104, 106, 108, 115, and 170 may occur using a variety of communication protocols and data formats. According to some embodiments, the communication protocols and data formats may be proprietary in some instances and standardized in some instances. IEDs 104, 106, 108, 115, and 170 may also communicate settings information, IED identification information, communications information, status information, alarm information, and the like.

IEDs 104, 106, 108, and 115 may be deployed in populated areas, and accordingly may be placed in physical proximity to the general public. For example, system 100 may be situated in an urban environment having a plurality of substations 111, 119, 141, and 151 located throughout a city. Accordingly, controlling physical access to the substations and the IEDs poses difficulty. An unauthorized actor may attempt to gain physical access to substations 111, 119, 141, and 151 and/or their constituent equipment. Upon gaining physical access to one of substations 111, 119, 141, and 151, the IEDs in the substations may be exposed to threats such as pushing buttons, connecting to communication ports or the like.

Obtaining physical access to the communication links in substations 111, 119, 141, and 151 may allow an unauthorized user to avoid certain security measures intended to prevent unauthorized access to communications among IEDs 104, 106, 108, 115 and 170. Communications among IEDs 104, 106, 108, 115, and 170 may typically be trusted communications. Accordingly, communications purportedly originating from a trusted location, trusted network, or trusted source may be more easily exploited by an unauthorized user to implement changes to IED settings, triggering alarms, or otherwise disrupting the operation of system 100.

Figure 2:
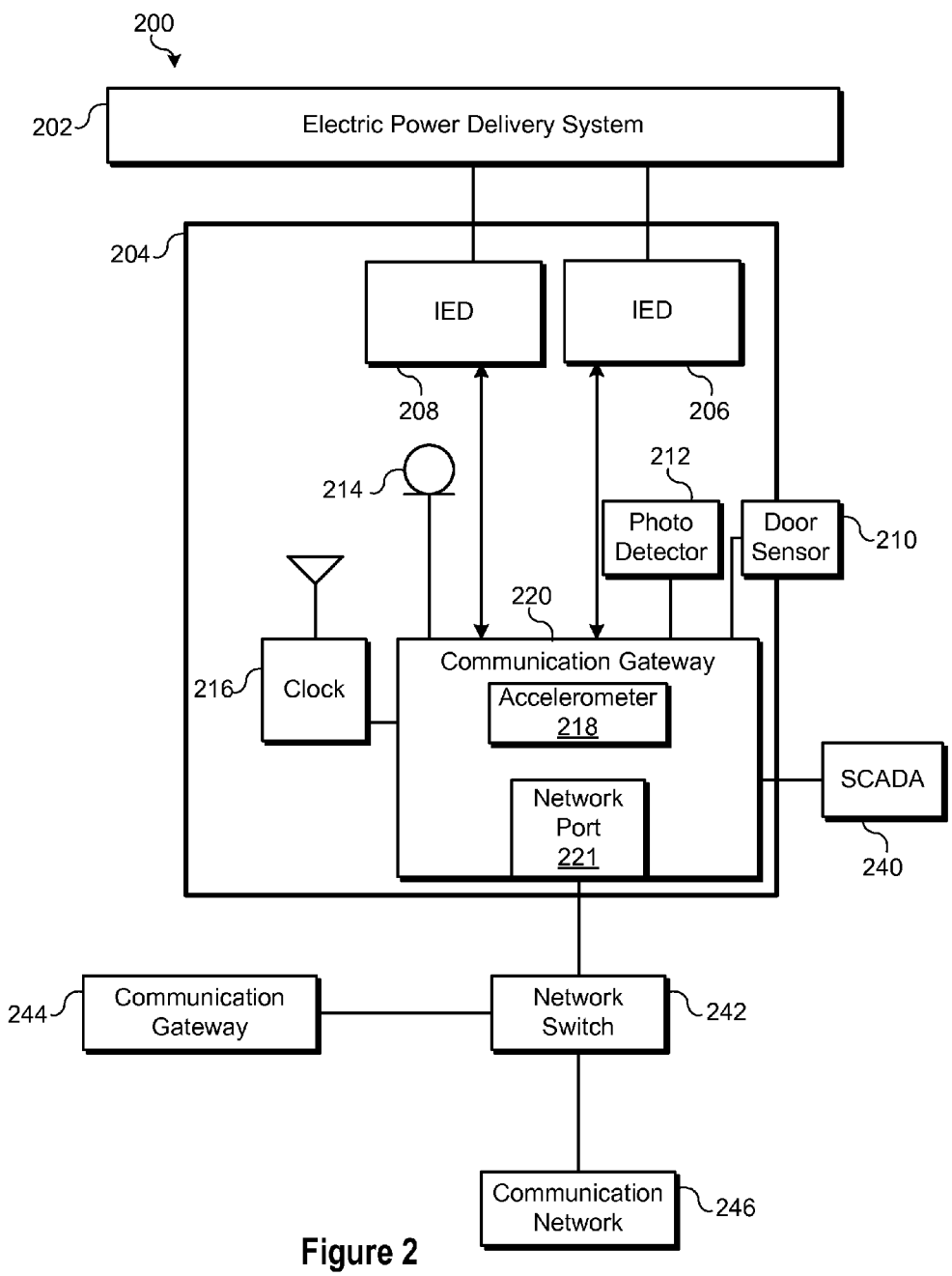
FIG. 2 illustrates a simplified block diagram of a system for detecting and responding to unauthorized access to a communication device consistent with various embodiments of the present disclosure.

FIG. 2 illustrates a simplified block diagram of a system 200 for detection and response to unauthorized access to an IED or other communications device. An enclosure 204 may be used to enclose various devices such as IEDs 206 and 208, clock 216, and communications gateway 220. According to some embodiments, the enclosure 204 may comprise a pole-mounted cabinet, a freestanding structure, or other enclosure configured to house infrastructure associated with an electric power delivery system 202.

The IEDs 206 and 208 may be in electrical communication with the electric power delivery system 202 for providing protection, control, metering, and/or automation thereto. IEDs 206 and 208 may be in communication with the communications gateway 220, which may be in secure communication with SCADA 240, and/or a communications network 246. Communication gateway 220 may include a network port 221, which may be in communication with network switch 242. The communications network 246 may facilitate communications with other IEDs via other communications gateways. A network switch may exist between the communication gateway 220 and the communication network 246. Other communications gateways 244 may also be in communication with the network switch 242.

Clock 216 may be in communication with a common time source such as a global navigational satellite system (GNSS), a time source (e.g., a time source provided by a GPS), a WWVB or WWV broadcast, or other common time source. Clock 216 may provide a time signal to communication gateway 220, which may, in turn, provide a time signal to IEDs 206 and 208.

To detect unauthorized access to enclosure 204, communication gateway 220 may further be in communication with a door sensor 210 configured to detect an opening of a door of the enclosure 204 using any suitable detection mechanism. In some embodiments, door sensor 210 may be a cabinet door pin wired to a contact input of the communication gateway 220. In further embodiments, door sensor 210 may be a magnetic sensor or a pressure pin switch wired to a contact input of communication gateway 220. Door sensor 210 may be configured to signal communication gateway 220 if it detects opening of a door of the enclosure 204.

Furthermore, to detect unauthorized access to enclosure 204, communication gateway 220 may be in communication with a photo detector 212. The photo detector 212 may detect when the enclosure 204 is opened by a change in lighting within the enclosure 204. In certain embodiments, the photo detector 212 may be capable of detecting changes in light density. The photo detector 212 may be configured to signal the communication gateway 220 when light is detected.

The communication gateway 220 may be in communication with a microphone 214. The microphone 214 may detect frequency and amplitude attributes to detect a physical tampering, as well as events happening on the power system. That is, microphone 214 may detect sounds, and communicate electrical signals representing such sounds to the communication gateway 220. Communication gateway 220 may include predetermined sound attributes such that may permit communication gateway 220 to differentiate between sounds signifying unauthorized physical access (such as cutting metal or breaking locks), sounds signifying events on the electric power system (such as breaker opening, tap position changing, and the like), sounds associated with natural phenomenon (such as rain, hail, thunder, etc.), and sounds associated with environmental conditions (such as traffic, horns, etc.). In another embodiment, the microphone 214 may be capable of differentiating different events, and signaling the communication gateway 220 when a sound corresponding with an unauthorized access is detected. According to some embodiments, sound detected by microphone 214 may be transmitted to a central monitoring station so that an operator may listen to the sounds and make a determination of whether such sounds are indicative of an attempt to gain unauthorized access.

The communication gateway 220 includes an accelerometer 218 for detecting motion. The accelerometer 218 may be capable of providing a signal to the communication gateway 220 corresponding with motion. According to some embodiments, accelerometer 218 may comprise a device external to communication gateway 220. The communication gateway 220 may use the signal to detect when a motion corresponding with unauthorized access is present. For example, repeated physical shocks may correspond with striking the enclosure 204 in an attempt to break a lock and gain access. In another embodiment, the accelerometer 218 detects natural phenomena and/or environmental conditions, such as earthquakes or large storms that may be fed back to the control system so operations can make appropriate adjustments to power system configurations. Further, some embodiments consistent with the present disclosure may be mounted to a utility pole. Automobile accidents may occasionally result in collisions with utility poles, and accordingly, an accelerometer may be triggered in the event that the pole to which the device is mounted is struck by an automobile.

Given that natural phenomenon or environmental conditions (e.g., an earthquake or vehicle collision may trigger an accelerometer, thunder may trigger a microphone, etc.) may trigger one or more physical intrusion detectors, certain embodiments consistent with the present disclosure may identify alternative indications of unauthorized access prior to implementing a security action. According to one embodiment, detection signals may be compared based on physical proximity of devices. For example, to the extent that an earthquake triggers an accelerometer in one location, nearby devices may be similarly triggered. Similarly, severe weather may also impact multiple devices in the same geographic vicinity, and thus a comparison of information among such devices may provide an alternative indication of whether a detection signal received from an intrusion detection system corresponds to an attempt to gain unauthorized access or to natural phenomena.

In addition to monitoring physical conditions (e.g., light, sound, motion, etc.) patterns in the data transmitted to or from communication gateway 220 may also be analyzed in order to determine attempts to obtain unauthorized physical access. When the communication gateway 220 detects a change in communication on one of the ports, it may be due to attempted unauthorized access. For example, if a communication medium from an IED is removed from its port, the communication over that port will change from its baseline. Communication gateway 220 may then detect an attempted unauthorized access. Accordingly the communication gateway 220 may be configured to detect when an unauthorized actor unplugs an active cable, plugs in another cable, and/or begins using the communication channel.

Communication gateway 220 may include a plurality of communication ports (e.g., network port 221, a port for communication with a SCADA system 240, ports for receiving input from photo detector 212, door sensor 210, and microphone 214, etc.). Communication ports may be embodied in a variety of ways, including serial ports, USB ports, Ethernet ports, IEEE 1394 ports, etc. According to some embodiments, each of photo detector 212, door sensor 210, and microphone 214 may be in communication with a communication port associated with communication gateway 220. According to other embodiments communication gateway 220 may include various sensors (e.g. microphone, photo detector, etc.) as integrated components. According to various embodiments, elements configured to detect unauthorized access may be referred to as physical intrusion detectors.

Communication gateway 220 may monitor each of its communications ports, and establish a baseline for communication on each port. For example, a port in communication with the clock 216 will establish a baseline of communication corresponding with a signal from the clock 216. The ports in communication with IEDs 206 and 208 may establish a different baseline. Further, ports that are not used will establish yet another baseline. A baseline may comprise a number of factors, such as type of data, volume of data, etc. For example, a baseline may show that a particular port historically has a very low data transmission rate. Activity during a particular period may be compared to the baseline in order to determine whether such activity is consistent with the baseline or constitutes a departure from the baseline. A significant departure from the historical data rate may indicate a departure from the baseline, and accordingly may suggest an abnormal condition, such as unauthorized access.

A variety of techniques may be utilized in order to determine that an unauthorized actor has begun using the communication channel. For example, MAC address authentication may be one way to determine the presence of a newly connected device. When authorize changes are made, a MAC address associated with the device to be added may be specified in advance so that indications from the newly added authorized device are accepted and do not give rise to an indication of unauthorized access. According to other embodiments, criteria such as IP addresses, communications protocols, communication port numbers, etc., may be used in order to detect a newly added unauthorized device. Still further, technologies such as USB, IEEE 1394, eSATA and the like may be used to recognize when new devices are connected to a system for the first time. Devices connected using USB, IEEE 1394, and eSATA, and similar technologies, may be referred to as peripheral devices. If the connection of such a device is unexpected, the newly connected device may be designated as an unauthorized device and one or more security actions may be taken.

Accordingly, communication gateway 220 may include several methods to detect unauthorized physical access. Communication gateway 220 may be configurable to minimize false positives by requiring more than one signal indicating unauthorized access. According to one embodiment, the communication gateway 220 may require at least two signals (e.g., a signal from each of the door sensor and the photo detector) to determine unauthorized physical access. In another embodiment, the communication gateway 220 may require certain combinations of signals to determine unauthorized physical access.

Once unauthorized physical access is detected, the communications gateway 220 may take one or more actions. In one embodiment, the communication gateway 220 may have the ability to configure a normal cybersecurity profile and an elevated cybersecurity profile. Based on the detection of cyber-attack or physical tampering, the communication gateway 220 may adjust to the elevated profile automatically. For example, if the door sensor determines that the door has been opened, and there are no scheduled work orders for that cabinet, the cybersecurity profile may move to the elevated state from the normal state in an attempt to restrict further compromise of the larger system.

In one embodiment, when the communications gateway 220 detects unauthorized access, it may alert upstream network devices (such as network switch 242, communications gateway 244, and communications network 246) that the communications from enclosure 204 can no longer be trusted and to quarantine any communications from enclosure 204 and/or devices upstream from enclosure 204. Such an alert may be generated as soon as the unauthorized access is detected and the cyber response may be configurable in the upstream communication device to terminate all communications, to record all traffic, and/or to continue typical operations but alert upstream devices to the unauthorized access.

The communication gateway 220 may be capable of supervisory override according to certain embodiments consistent with the present disclosure. That is, if authorized access to the enclosure 204 is scheduled, unauthorized access detection may be temporarily suspended. Further, responses to unauthorized physical access may be temporarily suspended. Such override can be accomplished through SCADA or engineering access, according to various embodiments. An override may be appropriate where an unplanned event requires physical access to an enclosure. According to one example, an override may be appropriate in an instance where a vehicle has collided with utility pole on which an enclosure is located. Maintenance personnel may override a security action in order to allow a portion of the electrical power delivery system to be deenergized while the accident is addressed.

According to the embodiment illustrated in FIG. 2, communication gateway 220 may be physically distinct from IEDs 208 and 206; however, according to alternative embodiments, certain functionality associated with communication gateway 220 may be incorporated into an IED. According to such embodiments, an IED may comprise a plurality of ports configured to receive input from sensors of various types (e.g. microphone, a door sensor, a photo detector, an accelerometer, etc.). Further, such an IED may comprise ports configured for communication with a network and/or a SCADA system.

Figure 3A:
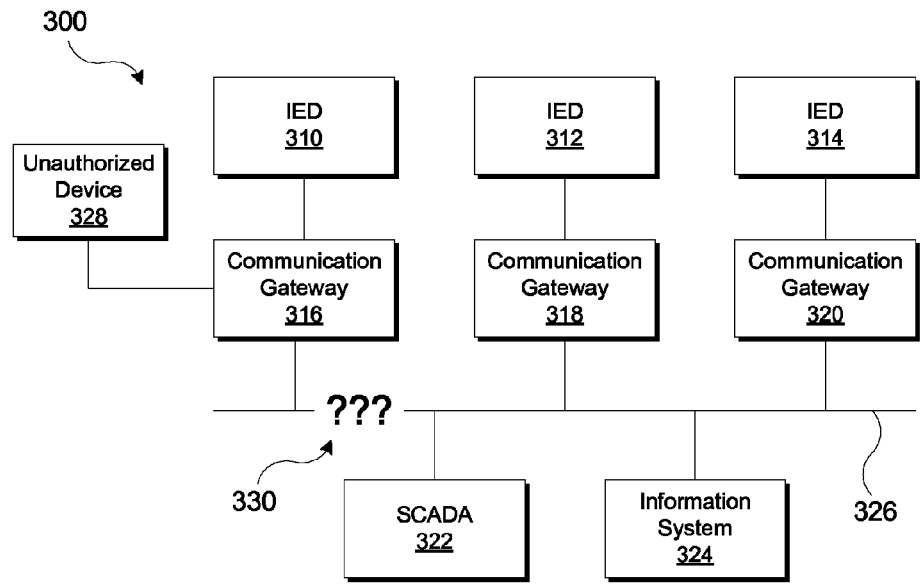
FIG. 3A illustrates a conceptual representation of a system implementing a security action as a result of a detection of an unauthorized device consistent with various embodiments of the present disclosure.

FIG. 3A illustrates a conceptual representation of a system 300 implementing a security action as a result of a detection of an unauthorized device 328 consistent with various embodiments of the present disclosure. According to the embodiment illustrated in FIG. 3A, IEDs 310, 312, and 314 are in communication with communication gateways 316, 318, and 320, respectively. Communication gateways 316, 318, 320 are each in communication with a network 326. In addition, SCADA system 322 and information system 324 are also in communication with network 326. According to alternative embodiments, IEDs 310, 312, and 314 may be physically integrated with communication gateways 316, 318, and 320, respectively.

In order to connect unauthorized device 328 to communication gateway 316, physical access to communication gateway 316 may be necessary. Accordingly, one or more physical intrusion detection signals (e.g., light from the opening of the cabinet, sound associated with opening a cabinet door, the tripping of a door sensor, etc.) may be generated as a result of an unauthorized actor obtaining physical access to communication gateway 316. The connection of unauthorized device 328 with communication gateway 316 may further provide an alternative indication of unauthorized access. For example, communication gateway 316 may determine that a MAC address associated with unauthorized device 328 is unrecognized.

As a result of the physical intrusion detection systems and the alternative indication of unauthorized access provided by connecting unauthorized device 328 to communication gateway 316, system 300 may implement a security action. In a particular embodiment illustrated in FIG. 3A, communication from communication gateway 316 may be deemed suspicious or un-trusted, as designated by question marks 330. As described above, communication among the various devices in system 300 may typically be trusted; however on the detection of unauthorized access, devices upstream from communication gateway 316 may be notified of the unauthorized access, and accordingly may no longer trust communications received from communication gateway 316. As noted above, one of the indicia upon which certain communications may be trusted is receipt from a known node or trusted device in a network. Following the detection of unauthorized access, the node associated with communication gateway 316 may no longer be deemed trusted. Accordingly, communications from communication gateway 316 and devices upstream from communication gateway 316 may no longer be trusted (e.g., IED 310 and unauthorized device to 328).

Various protocols may be utilized to differentiate trusted and un-trusted communications according to embodiments consistent with the present disclosure. This may allow the network to adjust the policies and all appliances take cyber defense positions. In one embodiment, communication gateways 316, 318, and 320 may be configured to use a network access control protocol (e.g., IEEE 802.1X) to alert the other network appliances of an attempt to obtain unauthorized physical access to an enclosure. The 802.1X protocol may provide port-based network access control and authentication of clients at the physical layer of the OSI model of computer networking. In another example, an indication of unauthorized physical access may be transmitted via a SCADA system. A SCADA point may be mapped to a physical intrusion flag following detection of unauthorized physical access. Communications associated with a physical intrusion flag may be considered un-trusted by the SCADA system.

Figure 3B:
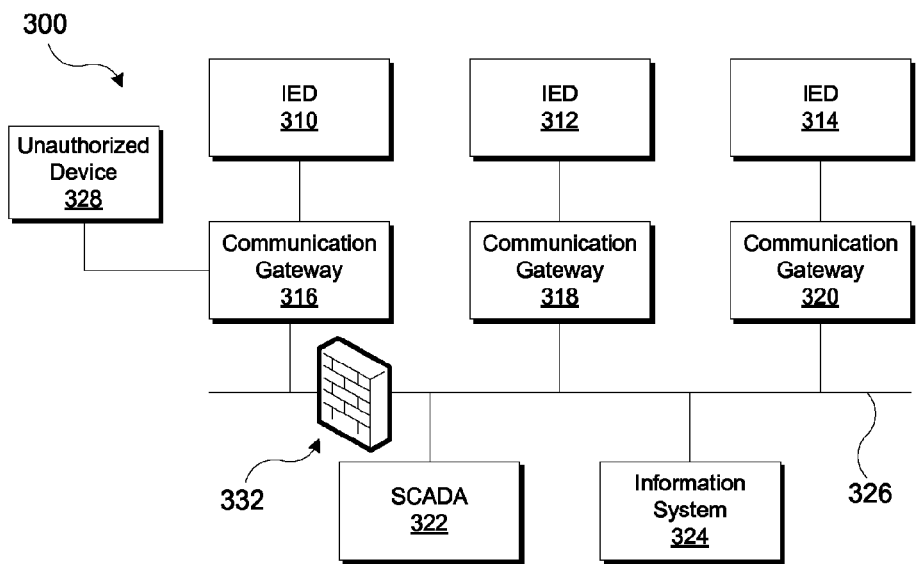
FIG. 3B illustrates a conceptual representation of the system of FIG. 3A implementing another security action as a result of a detection of an unauthorized device consistent with various embodiments of the present disclosure.

FIG. 3B illustrates a conceptual representation of the system of FIG. 3A in which a firewall 332 is placed between communication gateway 316 and other communication devices in system 300 as a result of a detection of an unauthorized device 328 consistent with various embodiments of the present disclosure. System 300, as illustrated in FIG. 3B may operate in a manner similar to system 300, as described above in connection with FIG. 3A; however, in FIG. 3B, system 300 may be configured to implement an alternative security action as a result of a detection of unauthorized device 328. Firewall 332 may be configured to block incoming communications from communication gateway 316, unauthorized device 328, and IED 310. Communications may be allowed to pass through firewall 332 directed to communication gateway 316 and IED 310. In other words, firewall 332 may permit downstream communication to pass, but firewall 332 may block upstream communication.

According to still further embodiments, system 300 as illustrated in FIG. 3A and FIG. 3B may implement alternative security actions upon the detection of unauthorized device 328. For example, system 300 may quarantine upstream communications from communication gateway 316. In another example, system 300 may simulate responses to communications received from unauthorized device 328 without implementing any changes based on such communications.

Figure 4:
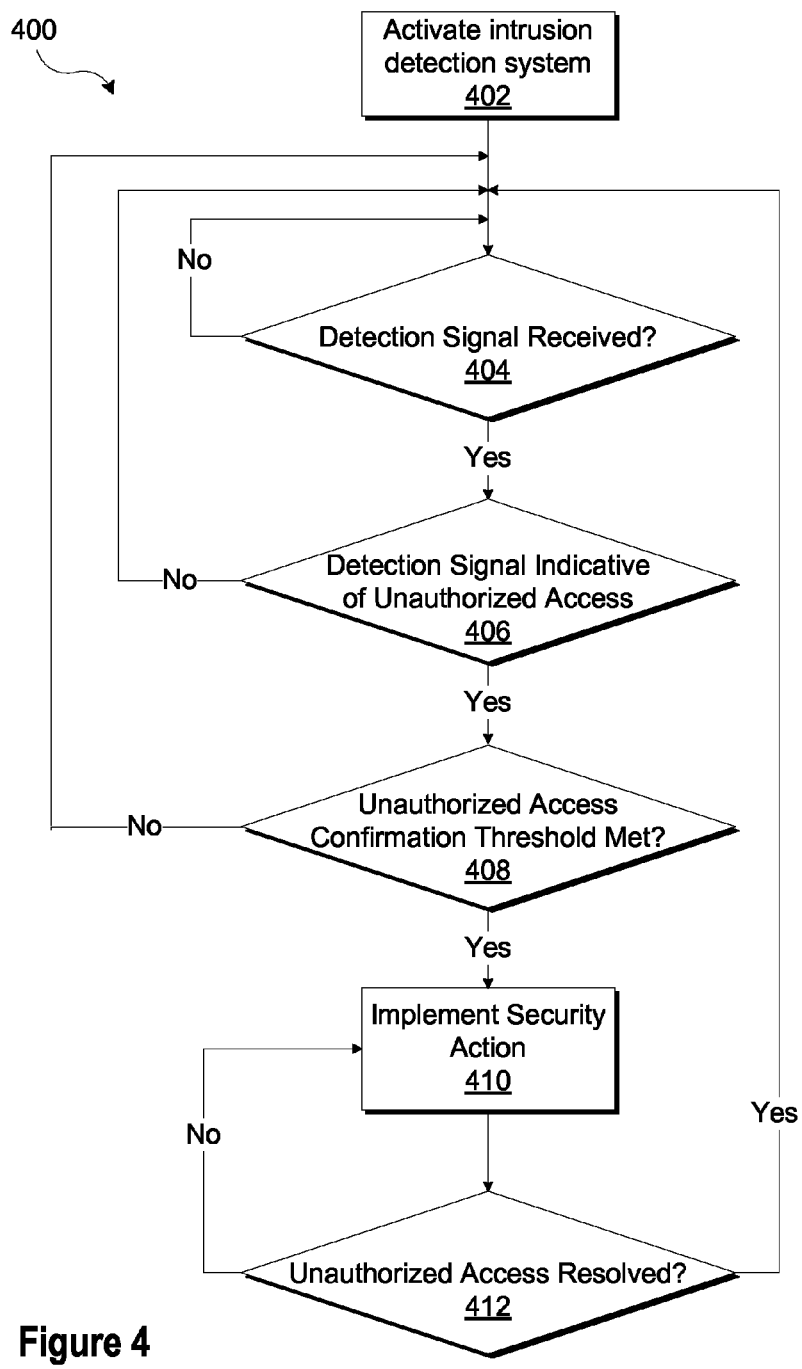
FIG. 4 illustrates a flowchart of a method for detecting unauthorized physical access to an enclosure containing equipment associated with an electric power delivery system consistent with various embodiments of the present disclosure.

FIG. 4 illustrates a flowchart of a method 400 for detecting unauthorized physical access to an enclosure containing equipment associated with an electric power delivery system consistent with various embodiments of the present disclosure. An intrusion detection system may comprise one or more components configured to detect physical access to an enclosure. As described in connection with various embodiments above, such components may include a microphone, a light sensor, a door sensor, an accelerometer, etc.

At 402, an intrusion detection system may be activated. Method 400 may await receipt of a detection signal from the intrusion detection system at 404. Once a detection signal is received, at 406, method 400 may determine whether the detection signal is indicative of unauthorized access. As described above, natural or environmental phenomena may trigger a detection signal; however, method 400 may determine at 406 that the detection signal is not indicative of unauthorized access. If such a determination is made, method 400 may return to 404 and wait detection of a subsequent signal.

Certain embodiments may require that an unauthorized access confirmation threshold be met. According to such embodiments, at 408, method 400 may determine whether the unauthorized access confirmation threshold is met. A wide variety of information may be analyzed in order to determine whether the confirmation threshold is met prior to implementing a security action. According to some embodiments, the unauthorized access confirmation threshold may be met by an alternative sensor indication. For example, the detection signal received at 404 may be based upon sound detected by a microphone. An alternative indication may be provided by a door sensor indicating that a door or panel of the enclosure has been opened. As illustrated by this example, alternative indications may be provided by multiple sensor components associated with a single enclosure. Embodiments relying on alternative indications may provide some protection against a false alarm caused by a single malfunctioning sensor.

The unauthorized access confirmation threshold may also be met using information provided by sensor components associated with other enclosures, according to various embodiments. For example, an earthquake may trigger an accelerometers associated with intrusion detection systems in different locations. According to various embodiments, to the extent that multiple accelerometers associated with intrusion detection systems in a physical proximity generate detection signals at approximately the same time, such signals may be compared in order to conclude that natural phenomena triggered the signals. As illustrated by this example, alternative indications may be provided by sensor components spread across multiple enclosures.

According to still further embodiments, the unauthorized access confirmation threshold may be met based upon an evaluation of a confidence interval associated with a particular detection signal. For example, a signal from a door sensor may be associated with a higher confidence interval than a signal from a microphone. Accordingly, in some embodiments, a detection signal based upon a door sensor may be sufficient to satisfy the confirmation threshold, but a signal from a microphone may be insufficient to satisfy the confirmation threshold without an alternative indication (e.g., input from an accelerometer, visual confirmation of an unauthorized person based upon inspection of an image obtained using a camera, confirmation from an operator at a central monitoring station that the sound corresponds to an attempt to obtain unauthorized physical access, etc).

At 410, a security action may be implemented based upon unauthorized access. A variety of types of security actions may be implemented. For example, according to some embodiments, a firewall may be configured to block upstream communications originating from a communication device located in an enclosure that has been accessed without authorization. According to other embodiments, communications for a communication device located in an enclosure that has been accessed without authorization may be flagged as untrusted. In one embodiment, the security action may include triggering output contacts based on the detection of unauthorized access. For example, the output contacts may trigger a light, siren, or even a camera. A camera activated as part of a security action may further be configured to transmit video stream or still images to a central monitoring station. According to some embodiments, the security action may comprise preventing engineering access or administrator-level access to the IED.

At 412, method 400 may determine whether the issue of unauthorized access has been resolved. Resolution of the unauthorized access may be achieved by dispatching service personnel to inspect the enclosure, performing diagnostic tests, reviewing video or images from the camera, restricting changes to settings associated with equipment located in the enclosure. Upon a determination that the unauthorized access issue is resolved, method 400 may return to 404 and await detection of other signals indicating unauthorized physical access.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed:

1. A communication device configured to provide a communication path to a remotely located intelligent electronic device (IED) of an electric power delivery system, the IED in an enclosure with the communication device and configured to detect and remediate unauthorized access, the communication device comprising:
   an IED communications port configured to communicate with an IED;
   a network port configured to transmit information received from the IED via a network and to transmit information received from the network to the IED; and
   control logic in communication with the IED communications port and the network port, the control logic configured to:
   receive an intrusion detection signal;
   determine that the intrusion detection signal is indicative of an attempt to obtain unauthorized access to one of the communication device, the IED, and a device in communication with the communication device;
   receive an alternative indication that is indicative of the attempt to obtain unauthorized access; and
   take a security action based upon the determination that the intrusion detection signal is indicative of the attempt to gain unauthorized access;
   wherein the intrusion detection signal is based on input received from a first sensor component, and the alternative indication is generated based on input received from a second sensor component.

2. The communication device of claim 1, wherein the control logic is further configured to generate a baseline representative of communication on one of the network port and the IED communications port, and the intrusion detection signal comprises a divergence of communication from the baseline on one of the network port and the IED communications port.

3. The communication device of claim 2, wherein the divergence comprises detecting a communication originating from one of an unauthorized machine access control address, an unauthorized Internet protocol address, an unauthorized port, and an unauthorized peripheral device.

4. The communication device of claim 1, further comprising a physical intrusion detection port; and wherein the intrusion detection signal comprises a physical intrusion detection signal including an output of at least one of a door sensor and a light sensor.

5. The communication device of claim 1, further comprising:
a physical intrusion detection port; and
a microphone in communication with the physical intrusion detection port;
wherein the control logic is further configured to differentiate sounds received by the microphone corresponding to unauthorized access from sounds corresponding with natural phenomenon and environmental conditions.

6. The communication device of claim 1, further comprising:
a physical intrusion detection port; and
a microphone in communication with the physical intrusion detection port;
wherein the control logic is further configured to:
transmit a sound received via the microphone to a central monitoring station via the network port, and
receive via the network port an indication from the central monitoring station that the sound received via the microphone is indicative of unauthorized access.

7. The communication device of claim 1, further comprising:
a physical intrusion detection port; and
an accelerometer in communication with the physical intrusion detection port, the accelerometer configured to detect an acceleration, wherein the control logic is further configured to:
differentiate between an acceleration corresponding to unauthorized access from an acceleration corresponding to a natural phenomenon and an acceleration corresponding to an environmental condition.

8. The communication device of claim 7, wherein the control logic is further configured to communicate to a central monitoring station information regarding the environmental condition to allow the central monitoring station to implement a control strategy in response to the environmental condition.

9. The communication device of claim 1, further comprising:
a camera in communication with the control logic;
wherein the control logic is further configured to transmit images captured by the camera to a central monitoring station via the network port based upon the determination that the intrusion detection signal is indicative of the attempt to gain unauthorized access.

10. The communication device of claim 1, wherein the information received from the network comprises an indication from a device in physical proximity to the communication device that an acceleration was detected by the device in physical proximity to the communication device.

11. The communication device of claim 1, wherein the control logic is further configured to temporarily suspend the security action upon receipt of a supervisory override.

12. The communication device of claim 1, wherein the security action comprises adjusting a cybersecurity profile of the communication device.

13. The communication device of claim 1, wherein the security action comprises alerting a supervisory control and data acquisition system of the attempt to gain unauthorized access.

14. The communication device of claim 1, wherein the security action comprises alerting upstream network devices of the attempt to gain unauthorized access.

15. The communication device of claim 14, wherein altering upstream network devices comprises invoking a network access control protocol.

16. The communication device of claim 1, wherein the security action comprises triggering a security device.

17. The communication device of claim 1, wherein the control logic is further configured to temporarily disable the security action for engineering access.

18. The communication device of claim 1, wherein the control logic is further configured to generate a baseline representative of communication on one of the network port and the IED communications port, and the alternative indication comprises a divergence of communication from the baseline on one of the network port and the IED communications port.

19. The communication device of claim 1, wherein the alternative indication is received via the network port from a remote device in communication with the network.

20. A method to detect and remediate unauthorized access to equipment associated with an electric power delivery system and contained in a remotely located enclosure, the method comprising:
communicating information with an IED via an IED communications port;
transmitting information received from the IED to a network via a network port;
transmitting to the IED information received from the network;
receiving an intrusion detection signal based on input received from a first sensor component;
receiving from a second sensor component an alternative indication that is indicative of the attempt to obtain unauthorized access;
determining that the intrusion detection signal is indicative of an attempt to obtain unauthorized access to one of a communication device and a device in communication with the communication device; and
taking a security action based upon the determination that the intrusion detection signal is indicative of the attempt to gain unauthorized access.

21. The method of claim 20, further comprising:
generating a baseline representative of communication on one of the network port and the IED communications port;
wherein the intrusion detection signal comprises a divergence of communication from the baseline on one of the network port and the IED communications port.

22. The method of claim 20, wherein the security action comprises adjusting a cybersecurity profile of the communication device.

23. The method of claim 20, wherein the security action comprises alerting a supervisory control and data acquisition system of the attempt to gain unauthorized access.

24. The method of claim 20, wherein the security action comprises alerting upstream network devices of the attempt to gain unauthorized access.

25. The method of claim 20, wherein the security action comprises triggering a security device.

26. The method of claim 20, further comprising:
generating a baseline representative of communication on one of the network port and the IED communications port, and the alternative indication comprises a divergence of communication from the baseline on one of the network port and the IED communications port.

27. An intelligent electronic device (IED) of an electric power delivery system, remotely located in an enclosure and configured to detect and remediate unauthorized access, the IED comprising:
an IED communications port configured to communicate with monitored equipment in electrical communication with an electric power delivery system;

a network port configured to transmit information received from the monitored equipment via a network and to transmit information received from the network to the monitored equipment; and control logic in communication with the IED communications port and the network port, configured to:
   receive an intrusion detection signal based on input received from a first sensor component;
   receive from a second sensor component an alternative indication that is indicative of the attempt to obtain unauthorized access;
   determine that the physical intrusion detection signal is indicative of an attempt to obtain unauthorized access to one of the IED and a device in communication with the IED; and
   take a security action based upon the determination that the indication is indicative of the attempt to gain unauthorized access.

* * * * *